US007763377B2

(12) United States Patent
Kozuki

(10) Patent No.: US 7,763,377 B2
(45) Date of Patent: Jul. 27, 2010

(54) ELECTROCHEMICAL ELEMENT HAVING AN ELLIPSOIDAL ASSEMBLY CONFIGURED FOR HIGH POWER INPUT

(75) Inventor: Kiyomi Kozuki, Moriguchi (JP)

(73) Assignee: Panasonic Corporation, Osaka (JP)

( * ) Notice: Subject to any disclaimer, the term of this patent is extended or adjusted under 35 U.S.C. 154(b) by 1009 days.

(21) Appl. No.: 11/150,123

(22) Filed: Jun. 13, 2005

(65) Prior Publication Data

US 2005/0277022 A1 Dec. 15, 2005

(30) Foreign Application Priority Data

Jun. 14, 2004 (JP) ............................ 2004-175186

(51) Int. Cl.
*H01M 10/00* (2006.01)
*H01M 4/64* (2006.01)
*H01M 4/02* (2006.01)

(52) U.S. Cl. ...................... 429/122; 429/211; 429/233; 429/209

(58) Field of Classification Search ................. 429/211
See application file for complete search history.

(56) References Cited

U.S. PATENT DOCUMENTS 5,154,993 A * 10/1992 Beatty ........................ 429/211
2004/0061476 A1 4/2004 Nakamaru et al.
2005/0058908 A1 3/2005 Imachi et al.
2005/0214642 A1 9/2005 Kim et al.

FOREIGN PATENT DOCUMENTS

CN 2598160 1/2004
CN 1599117 3/2005
CN 1681146 10/2005
JP 9-180761 7/1997
JP 10-050556 2/1998

(Continued)

OTHER PUBLICATIONS

English language Abstract of JP 9-180761, Jul. 11, 1997.

(Continued)

*Primary Examiner*—Dah-Wei D Yuan
*Assistant Examiner*—Maria J Laios
(74) *Attorney, Agent, or Firm*—Greenblum & Bernstein, P.L.C.

(57) ABSTRACT

The electrochemical element includes an electrode assembly accommodated in a case with an electrolyte. The electrode assembly is formed into a flat shape by winding positive and negative electrodes with a separator interposed therebetween. The positive electrode includes an exposed positive current collector portion uncoated with an active material and formed in one end in the width direction of a strip-shaped positive current collector, and a positive lead is attached to the exposed positive current collector portion. The negative electrode includes an exposed negative current collector portion uncoated with an active material and formed in the other end in the width direction of a strip-shaped negative current collector, and a negative lead is attached to the exposed current collector portion. The exposed positive current collector portion on the one end is pressed and welded, and the exposed negative current collector portion on the other end is pressed and welded to form the electrode assembly. This implements a current collection structure for providing stable conductive connection with high quality in a simple manner for an electrochemical element requiring high power.

10 Claims, 5 Drawing Sheets

FOREIGN PATENT DOCUMENTS

| | | |
|---|---|---|
| JP | 2000-040501 | 2/2000 |
| JP | 2000-294222 | 10/2000 |
| JP | 2001-038475 A * | 2/2001 |

OTHER PUBLICATIONS

English language Abstract of CN 1599117, Mar. 23, 2005.
English language Abstract of CN 1681146, Oct. 12, 2005.
English Language Abstract of JP 2000-294222, Oct. 20, 2000.
English Language Abstract of JP 2000-040501, Feb. 8, 2000.
English Language Abstract of JP 10-050556, Feb. 20, 1998.
U.S. Appl. No. 11/150,095 to Kozuki et al., filed Jun. 13, 2005.

* cited by examiner

ELECTROCHEMICAL ELEMENT HAVING AN ELLIPSOIDAL ASSEMBLY CONFIGURED FOR HIGH POWER INPUT

The present disclosure relates to subject matter contained in priority Japanese Patent Application No. 2004-175186 filled on Jun. 14, 2004, the contents of which is herein expressly incorporated by reference in its entirety.

BACKGROUND OF THE INVENTION

1. Field of the Invention

The present invention relates to an electrochemical element such as a battery or an electric double layer capacitor having a prismatic outer shape and comprising an electrode assembly composed of positive and negative electrodes wound into a flat shape, and being accommodated into a case together with an electrolyte. In particular the invention relates to an electrochemical element having a current collection structure designed for high power output.

2. Description of the Related Art

In an electrochemical element such as a battery or an electric double layer capacitor, an electrode assembly having a winding structure composed of positive and negative electrodes wound with a separator interposed therebetween is widely employed in order to increase a reaction area per unit volume. The electrode assembly is accommodated in a metal case with an electrolyte, and the case is sealed. An electrochemical element is configured through connecting the positive and negative electrodes to portions serving as positive and external negative connection terminals, respectively, for allowing an external connection.

The positive and negative electrodes are formed by coating an active material to a current collector made of a foil or a thin metal mesh plate, and thus a current path is created through connecting the positive and negative current collectors to portions serving as positive and external negative connection terminals, respectively, by leads. In this case, when only one portion of the current collector is connected to the portion serving as an external connection terminal, a current path from a distant portion in the wound strip-shaped current collector to the connected portion becomes longer, resulting in an increase in electrical loss and temperature rise during a high-rate charge/discharge. Particularly, in the case of an electric double layer capacitor in which energy can be charged/discharged in a short period of time, to advantageously utilize this property, the internal resistance of a current path should be reduced as much as possible.

In order to solve the above problems in the connection between an electrode assembly and external connecting portions for positive and negative electrodes, a battery structure has been developed for improving current collection efficiency (see Japanese Patent Laid-Open Publication No. 2000-294222). In this case, an electrode assembly is formed into a cylindrical shape through winding positive and negative electrodes with a separator interposed therebetween such that part of a current collector of the positive or negative electrode is protruded from one end of the electrode assembly. The current collector protruded from the end is bent inward by pressing the protruded collector in a direction of cylinder axis to form flat regions, and a current collecting plate is welded to the flat regions.

Another battery structure which is suitable for assembling a high power battery pack for an electric vehicle or the like has been developed (see Japanese Patent Laid-Open Publication No. 2000-040501). In this structure, strip-shaped positive and negative electrodes each having a current collector exposed from an edge in the width direction of the strip are wound around a flat winding core to which metal plates serving as positive and negative terminals are attached. The positive and negative terminals are welded to the exposed current collector portions of the positive and negative electrodes, respectively, to form a flat wound electrode, and the end of the each of the positive and negative terminals is extended from a battery case.

Besides the above two examples for a battery, a configuration for an electrical double layer capacitor formed through winding positive and negative electrodes has been developed (see Japanese Patent Laid-Open Publication No. Hei 10-050556). In this case, an electrode assembly is formed such that a plurality of current collecting leads are projected from the current collectors of the wound positive and negative electrodes along a line in a radial direction. The plurality of current collecting leads arranged in the radial direction are bundled, and the bundled portion is clamped with a terminal member made of the same material as the current collecting lead. The clamped portion is then welded to form an output terminal.

However, in the configuration disclosed in Japanese Patent Laid-Open Publication No. 2000-294222 in which a flat surface is formed through bending a current collector protruded from an end and welded with a current collector plate placed thereon, the welding conditions cannot be stabilized when a thin electrode current collector is employed for obtaining high capacity, resulting in a frequent short circuit due to heat fusion of a separator having a poor heat resistance. Particularly, this phenomenon often occurs in a lithium ion battery employing a thin metal foil serving as a current collector, resulting in the reduction in production yield.

The configuration disclosed in Japanese Patent Laid-Open Publication No. 2000-040501 in which positive and negative electrodes are wound around a winding core into a flat shape can be advantageously applied to an apparatus having a relatively large installation space such as an electric vehicle. However, since the winding core is required, the thickness of the battery cannot be reduced as a flat prismatic battery. Therefore, the battery has a disadvantage when the battery is employed in an apparatus requiring downsizing or a plurality of the batteries are integrated to form a battery pack.

In addition, in the configuration disclosed in Japanese Patent Laid-Open Publication No. Hei 10-050556 in which a plurality of current collecting tabs are formed in the radial direction of cylindrically wound positive and negative electrodes, the plurality of current collecting tabs are protruded from the electrodes which are cut into a strip shape. Therefore, the electrodes cannot be cut in an efficient manner, resulting in poor productivity.

SUMMARY OF THE INVENTION

The present invention has been made in view of the above problems in the conventional techniques. It is an object of the present invention to provide an electrochemical element comprising a connection structure which improves the current collection efficiency from an electrode assembly.

According to a first aspect of the present invention for achieving the above object, there is provided an electrochemical element comprising an electrode assembly accommodated in a case with an electrolyte, the electrode assembly including a positive electrode formed of a strip-shaped positive current collector coated with a positive electrode active material and a negative electrode formed of a strip-shaped negative current collector coated with a negative electrode active material, the positive electrode and the negative electrode being wound around with a separator interposed therebetween, a positive lead bonded to the positive electrode being connected to a portion serving as an external positive connection terminal, and a negative lead bonded to the negative electrode being connected to a portion serving as an external negative connection terminal. In this configuration, the positive electrode includes an exposed current collector portion at least at one end in a width direction where the positive electrode active material has not been coated. The negative electrode includes an exposed current collector portion at least at the other end in the width direction where the negative electrode active material has not been coated. The separator has a smaller width than those of the positive and negative electrodes, and the positive and negative electrodes with the separator interposed therebetween are wound around to form the electrode assembly having an ellipsoidal cross-section. The exposed current collector portion of the positive electrode protruding beyond the separator from the one end is pressed in the shorter side direction of the ellipsoidal cross-section and is welded to form a welding joint, and the exposed current collector portion of the negative electrode protruding beyond the separator from the other end is pressed in the shorter side direction of the ellipsoidal cross-section and is welded to form a welding joint.

According to the above configuration, the strip-shaped positive and negative electrodes are wound around into a flat shape to form the electrode assembly. Subsequently, the exposed current collector portion of the positive electrode protruding beyond the separator from the one end of the electrode assembly is pressed to be brought into contact with each other and welded, and the exposed current collector portion of the negative electrode protruding beyond the separator from the other end of the electrode assembly is pressed to be brought into contact with each other and welded. Therefore, the positive electrode is connected to the positive lead at a plurality of portions, and also the negative electrode is connected to the negative lead at a plurality of portions. Since current is collected from the plurality of portions of the strip-shaped positive and negative electrodes, an electrochemical element having a small internal resistance and excellent current collection efficiency is configured. Particularly, an electrical loss and a temperature increase during a high-rate charge/discharge are prevented.

According to a second aspect of the present invention, there is provided an electrochemical element comprising an electrode assembly accommodated in a case with an electrolyte, the electrode assembly including a positive electrode formed of a strip-shaped positive current collector coated with a positive electrode active material and a negative electrode formed of a strip-shaped negative current collector coated with a negative electrode active material, the positive electrode and the negative electrode being wound around with a separator interposed therebetween, a positive lead bonded to the positive electrode being connected to a portion serving as an external positive connection terminal, and a negative lead bonded to the negative electrode being connected to a portion serving as an external negative connection terminal. In this configuration, the positive or negative electrode includes an exposed current collector portion at least at one end in a width direction where the positive or negative electrode active material has not been coated. The separator has a smaller width than those of the positive and negative electrodes, and the positive and negative electrodes with the separator interposed therebetween are wound around to form the electrode assembly having an ellipsoidal cross-section. The exposed current collector portion of the positive or negative electrode protruding beyond the separator from the one end is pressed in the shorter side direction of the ellipsoidal cross-section and is welded to form a welding joint.

According to the above configuration, the positive and negative electrodes are wound around into a flat shape to form the electrode assembly. Subsequently, the exposed current collector portion of the positive or negative electrode is pressed and welded at the one end side. Then, the positive or negative electrode is connected to the lead at a plurality of portions. Therefore, an electrochemical element having a small internal resistance and excellent current collection efficiency is configured.

In any of the above configurations, the position of the separator interposed between the positive and negative electrodes and the width of the separator are adjusted such that the edges thereof are located inside the edge of the exposed current collector portion to be pressed and welded and are located outside the edge of the electrode not to be pressed and welded. Therefore, a short-circuited between the positive and negative electrodes due to the deformation of the electrodes is prevented during pressing the exposed current collector portion.

In addition, the connection of the positive and negative leads to the positive and negative electrodes, respectively, may be configured such that the positive lead is connected to the exposed current collector portion formed on the positive electrode in one end in the lengthwise direction and the negative lead is connected to the exposed current collector portion formed on the negative electrode in the other end in the lengthwise direction. The positive or negative lead may also be connected to the exposed current collector portion to be pressed and welded. In this case, the configuration of the positive and negative electrodes may be simplified.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Figure 1:
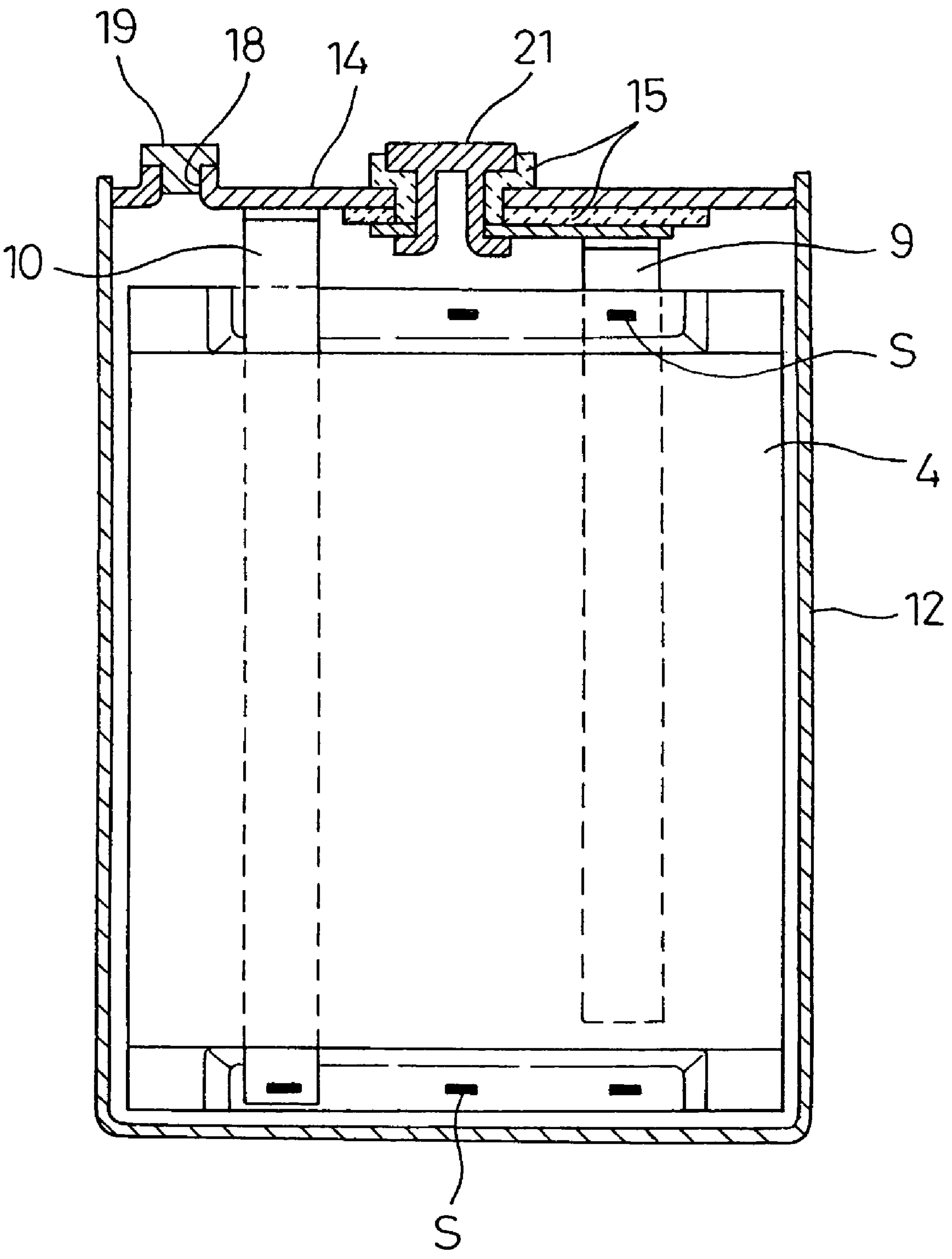
FIG. 1 is a cross-sectional view showing the configuration of a lithium ion rechargeable battery according to one embodiment of the present invention.

In the present embodiment, the connection structure according to the present invention is applied to a lithium ion rechargeable battery which is an example of an electrochemical element. As shown in FIG. 1, the lithium ion rechargeable battery according to the present embodiment has an outer shape of a flat prismatic shape, and comprises an electrode assembly 4 accommodated in a battery case 12. The electrode assembly 4 is formed by winding a positive electrode and a negative electrode with a separator interposed therebetween such that the cross section thereof has an ellipsoidal shape. A positive lead 9 pulled out from the positive electrode is electrically connected to an external positive connection terminal 21 provided in a sealing plate 14 which seals the opening of the battery case 12 and is insulated from the external positive connection terminal 21. A negative lead 10 is pulled out from the negative electrode and is connected to the sealing plate 14.

Figure 2A:
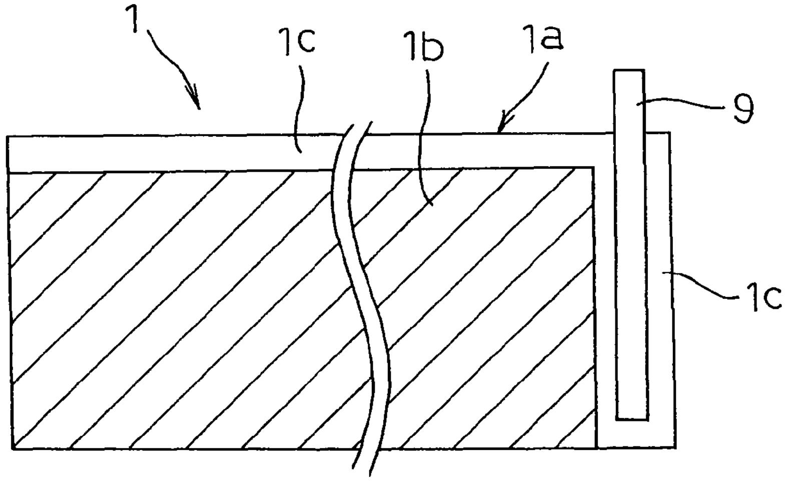
FIG. 2A is a plan view showing the configuration of a positive electrode of the battery shown in FIG. 1.

As shown in FIG. 2A, the positive electrode 1 composing the electrode assembly 4 is formed from a strip-shaped positive current collector 1*a* having a required length and a width. Both sides of the positive current collector 1*a* are coated with a positive electrode active material 1*b* such that an uncoated exposed positive current collector portion 1*c* is formed on each side at one end in the width direction and one end in the lengthwise direction. A positive lead 9 is welded on the exposed positive current collector portion 1*c* formed in the one end in the lengthwise direction on the positive current collector 1*a*. More specifically, the positive electrode active material 1*b* is prepared through mixing $LiMn_2O_4$, which is obtained through baking a mixture of electrolytic manganese dioxide ($MnO_2$) and lithium carbonate ($Li_2CO_3$) in a ratio by weight of Li/Mn=½ at 800° C. for 20 hours, with acetylene black serving as a conductive agent and polyvinylidene fluoride serving as a binder in a ratio by weight of 92:3:5. In order to obtain a paste-like mixture through kneading, a solution of polyvinylidene fluoride in a solvent (N-methylpyrrolidone (NMP)) is employed. The paste of the positive electrode active material 1*b* is applied to both sides of the positive electrode collector 1*a* made of aluminum foil having a thickness of 15 μm such that the uncoated exposed positive current collector portion 1*c* having a predetermined width is formed at the one end in the width direction and the one end in the lengthwise direction, and the coated positive electrode active material is subjected to drying. The layers of the positive electrode active material 1*b* are formed such that the total thickness of the coated positive electrode active material on both the sides after drying is 280 μm, which is reduced to 200 μm by compression molding.

Figure 2B:
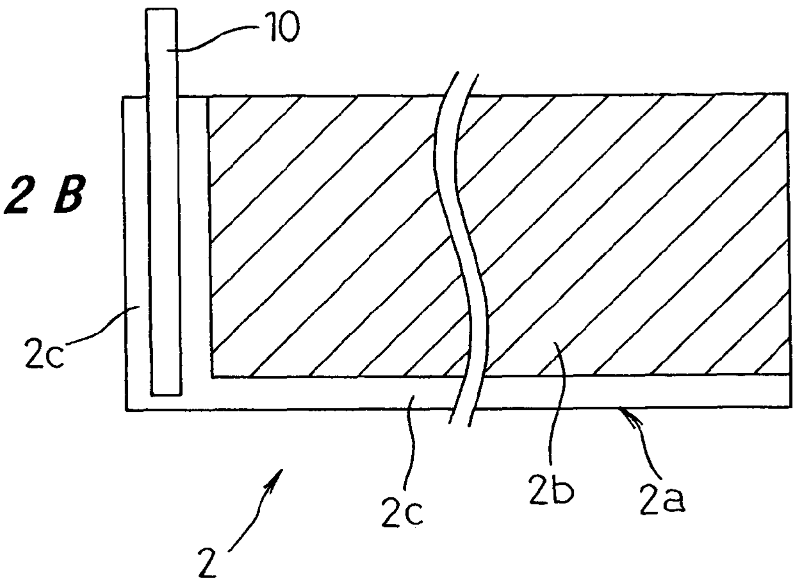
FIG. 2B is a plan view showing the configuration of a negative electrode of the battery shown in FIG. 1.

As shown in FIG. 2B, the negative electrode 2 is formed from a strip-shaped negative current collector 2*a* having a required length and a width. Both sides of the negative current collector 2*a* are coated with a negative electrode active material 2*b* such that an uncoated exposed negative current collector portion 2*c* is formed on each side at the other end (opposite to the one end) in the width direction and the other end (opposite to the one end) in the lengthwise direction. A negative lead 10 is welded on the exposed negative current collector portion 2*c* formed in the other end in the lengthwise direction on the negative current collector 2*a*. More specifically, the negative electrode active material 2*b* is prepared through mixing artificial graphite with styrene-butadiene rubber (SBR) serving as a binder in a ratio by weight of 97:3. In order to obtain the negative electrode active material 2*b* as a paste-like mixture by kneading, an aqueous dispersion of styrene-butadiene rubber is employed, and the above mixing ratio is based on the solid contents. The paste of the negative electrode active material 2*b* is applied to both sides of the negative electrode collector 2*a* made of a copper foil having a thickness of 14 μm such that the uncoated exposed negative current collector portion 2*c* having a predetermined width is formed at the other end in the width direction and the other end in the lengthwise direction, and the coated negative electrode is subjected to drying. The coated negative electrode 2 is subjected to compression molding to obtain a thickness of 170 μm.

Figure 3A:
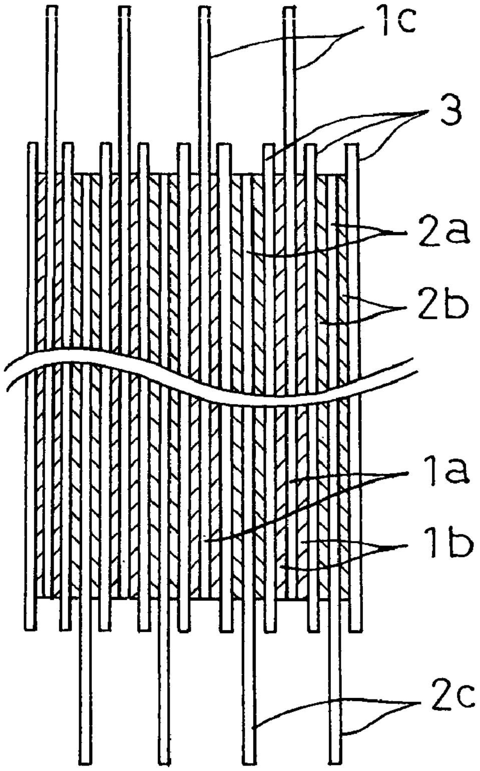
FIGS. 3A and 3B are schematic cross-sectional views showing the configuration of the electrode assembly employing the electrodes of the above.

The positive and negative electrodes 1 and 2 configured as above are layered with a separator 3 made of a microporous polyethylene film interposed therebetween, and wound around into a spiral shape to form the electrode assembly 4 having an ellipsoidal cross-section. In this case, the layered positions of the positive and negative electrodes 1 and 2 and the width of the separator 3 are adjusted such that, at the one end side in which the exposed positive current collector portion 1*c* is formed on the positive electrode 1 in the width direction, the exposed positive current collector portion 1*c* is located outside the one edge of the separator 3 and the one edge of the negative electrode 2 is located inside the one edge of the separator 3. At the other edge side in which the exposed negative current collector portion 2*c* is formed on the positive electrode 2 in the width direction, the exposed negative current collector portion 2*c* is located outside the other edge of the separator 3 and the other edge of the positive electrode 1 is located inside the other edge of the separator 3, as shown in FIG. 3A.

Figure 3B:
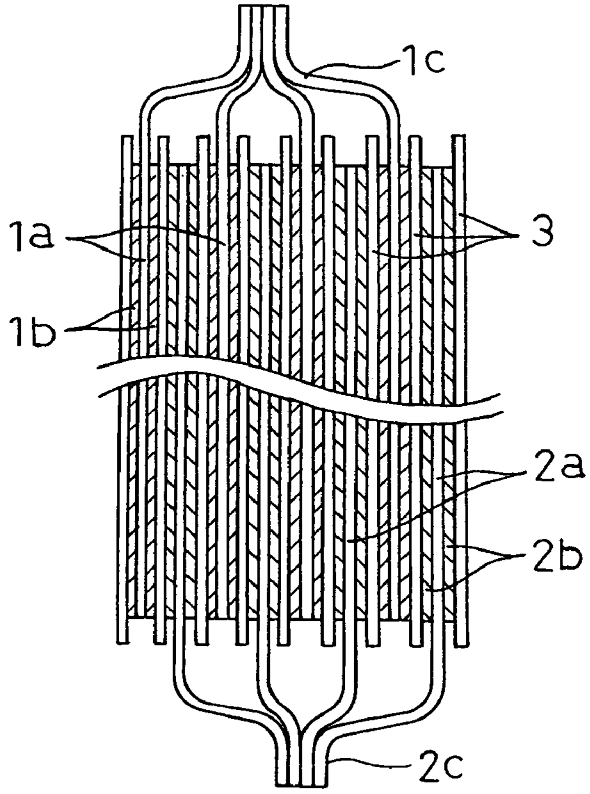
Figure 4:
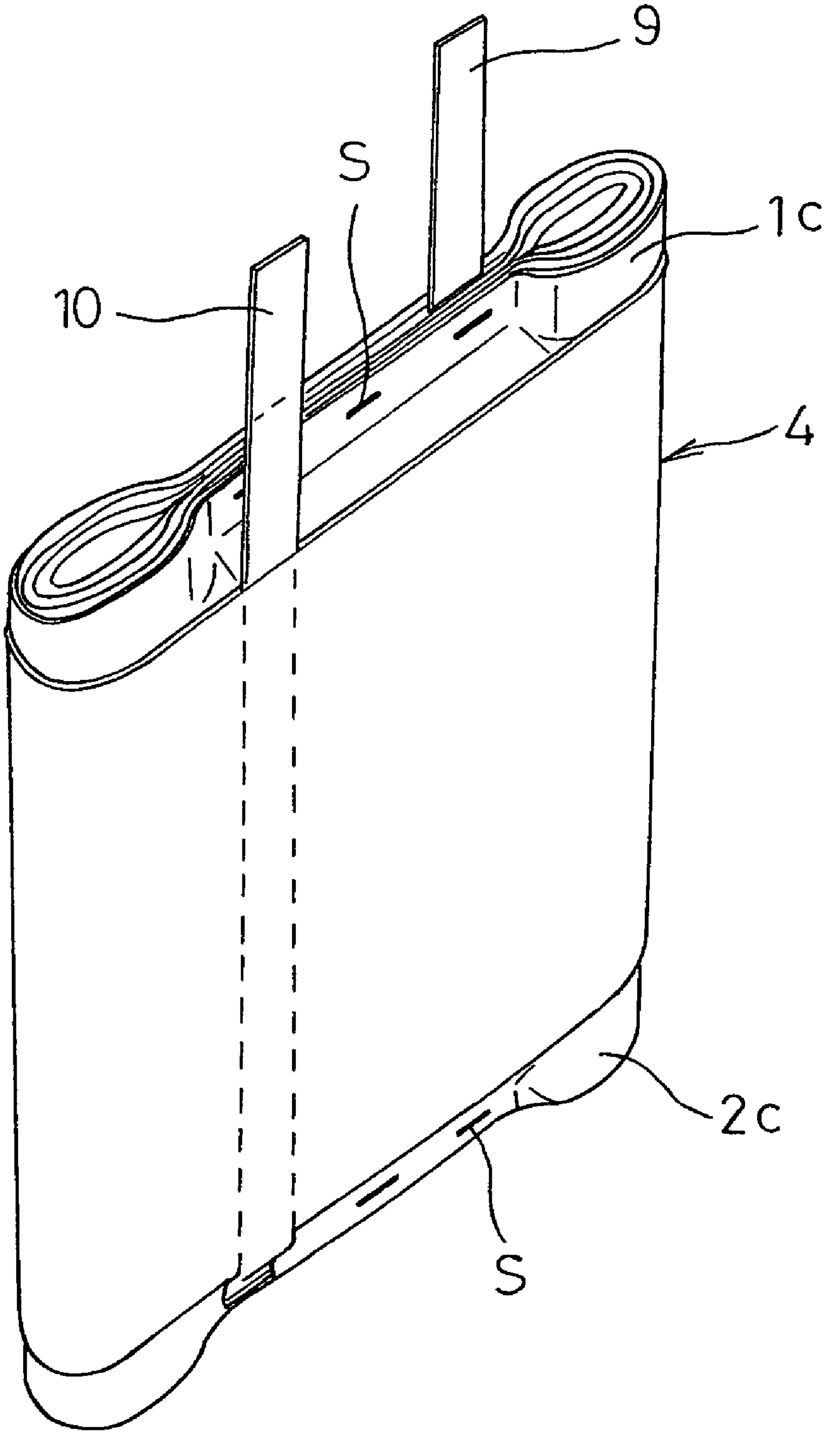
FIG. 4 is a perspective view showing the configuration of the electrode assembly.

Next, the layered portions of the exposed positive current collector portion 1*c* of the positive electrode 1 are pressed in the thickness direction of the wound electrode assembly 4 and brought the layered portions of the exposed positive current collector portion 1*c* adjacent to each other through the negative electrode 2 and the separator 3 into pressure contact. The pressure-contacted portion is then welded at a welding point S to form a welding joint, as shown in FIGS. 3B and 4. Similarly, for the negative electrode 2, the layered portions of the exposed negative current collector portion 2*c* of the negative electrode 2 are pressed in the thickness direction of the wound electrode assembly 4 and brought the layered portions of the exposed negative current collector portion 2*c* adjacent to each other through the positive electrode plate 1 and the separator 3 into pressure contact. The pressure-contacted portion is then welded at a welding portion S to form a welding joint. Only one welding portion S may be employed, but the welding joint is preferably made at a plurality of welding portions.

The electrode assembly 4 configured as above is then inserted into the battery case 12 formed into a flat prismatic tube having a bottom as shown in FIG. 1. One end of the positive lead 9 is bonded to the exposed positive current collector portion 1*c* formed in the lengthwise direction on the positive electrode 1 composing the electrode assembly 4, and the other end of the positive lead 9 is welded to the external positive connection terminal 21 insulatingly attached to the sealing plate 14 through the use of an insulator 15. Also, one end of the negative lead 10 is bonded to the exposed negative current collector portion 2*c* formed in the lengthwise direction on the negative electrode 2, and the other end of the negative lead 10 is welded to the sealing plate 14. The periphery of the sealing plate 14, to which the positive and negative leads 9 and 10 are bonded, is laser-welded to the opening of the battery case 12 to seal the opening of the battery case 12. An inlet 18 is provided in the sealing plate 14, and an electrolyte is introduced into the battery case 12 though the inlet 18. After an impregnation process for the electrode assembly 4, a sealing plug 19 is welded to the inlet 18 for hermetically sealing the battery case 12, and thus the assembly of the lithium ion rechargeable battery having a flat prismatic shape is completed. The electrolyte employed is a mixed solvent of ethylene carbonate (EC) and diethyl carbonate (DEC) at volume ratio of 1:1 with a 1 mol/$dm^3$ lithium hexafluorophosphate ($LiPF_6$) dissolved therein.

The lithium ion rechargeable battery configured as above has a prismatic outer shape, and comprises a current collecting structure which supports a high-rate charge/discharge current. Therefore, a battery pack with space efficiency will be configured by combining such a plurality of the lithium ion rechargeable batteries, and such battery pack is preferable to be employed as a power source of an electric tool or electric vehicle.

In order to evaluate the effectiveness of the current collecting structure described above, prismatic lithium ion rechargeable batteries (width: 50 mm, height: 95 mm, thickness: 10 mm, design capacity: 3000 mAh) were fabricated by use of the structure of the embodiment and conventional structure for comparison.

Figure 5:
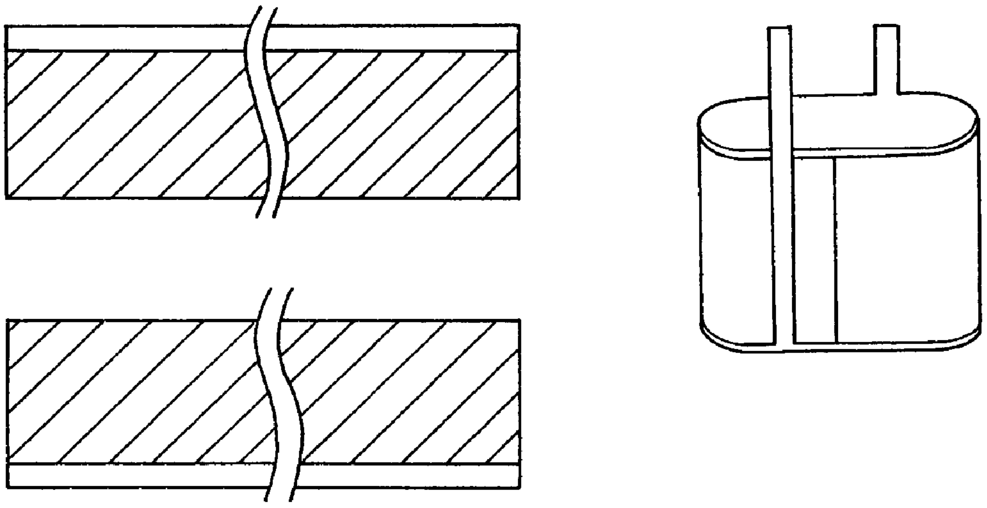
FIG. 5 is a schematic illustration showing the electrode structure of the prior art applied to a Comparative Example.
Figure 6:
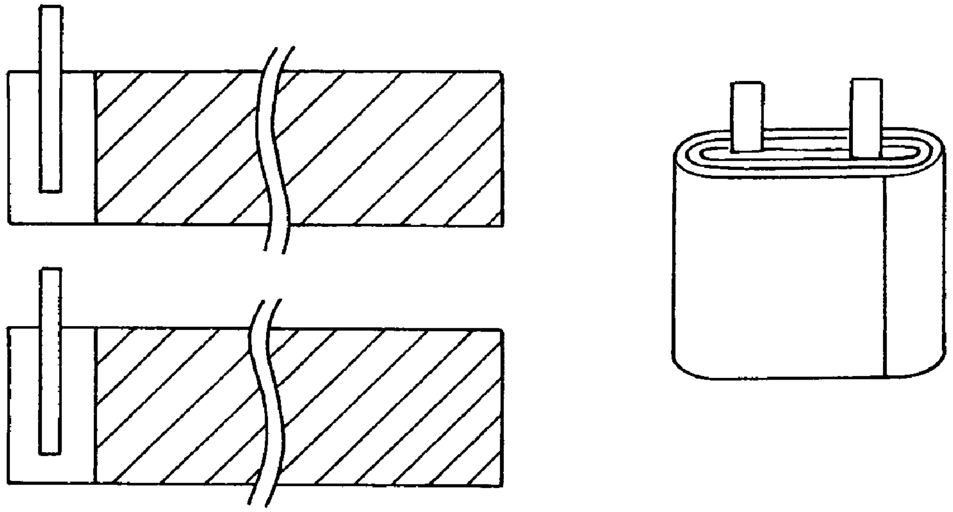
FIG. 6 is a schematic illustration showing the electrode structure of the prior art applied to another Comparative Example.

In Example 1, the current collecting structure according to the above embodiment is applied, and in Example 2, the current collecting structure according to the embodiment is applied only to the negative electrode side configuration. In Comparative Example 1, a conventional structure is applied. In this case, positive and negative electrodes each having an exposed current collector portion formed in one end in the width direction of each electrode are wound around into a flat shape, and respective current collector plates are welded to the exposed current collector portion extending from one end of the positive electrode and the exposed current collector portion extending from the other end of the negative electrode, as shown in FIG. 5. In Comparative Example 2, a conventional structure is also applied. In this case, a positive or negative lead is welded to an exposed current collector portion formed in one end in the lengthwise direction of either the corresponding positive or negative electrode, and the positive and negative electrodes are wound around into a flat shape. An insulation fault test was carried out on 100 electrode assemblies for each of the Examples and the Comparative Examples, and the internal resistance was measured for 25 batteries which had passed the insulation test for each of the Examples and the Comparative Examples.

<Insulation Fault Test>

The electrode assemblies having the abovementioned structures were fabricated, and a direct current resistance was measured by means of an insulation resistance tester connected to the positive and negative leads. An electrode assembly having a direct current resistance of less than 1 MΩ was determined as a defective, and the results shown in Table 1 were obtained. In Examples 1 and 2 and Comparative Example 2, insulation failure was not detected. However, 20 electrode assemblies of Comparative Example 1 out of 100 assemblies had insulation failure which might be generated during the welding process. In the electrode assemblies having insulation failure, a hole generated due to the heat during welding was found to be observed in the separator around the positive current collecting terminal, and the negative and positive electrodes were brought into contact. In this regard, it is concluded that the connection structure in which the periphery of the electrode is welded cannot not be properly applied to a device such as a lithium ion battery employing a thin electrode current collector.

TABLE 1

| | Number of Insulation Fault |
|---|---|
| Example 1 | 0/100 |
| Example 2 | 0/100 |
| Comparative Example 1 | 20/100 |
| Comparative Example 2 | 0/100 |

<Internal Resistance Measurement>

Batteries were fabricated using the electrode assemblies which had passed the insulation fault test. The batteries were charged at a constant current of 1500 mA up to 4.2V, and discharged at a constant current of 1500 mA to 3.0V. This cycle was repeated three times in total for activating the batteries. Subsequently, the internal resistance was measured by use of an AC current having a measuring frequency of 1 kHz. The results are shown in Table 2.

TABLE 2

| Battery No. | Example 1 Internal Resistance (mΩ) | Example 2 Internal Resistance (mΩ) | Comparative Example 1 Internal Resistance (mΩ) | Comparative Example 2 Internal Resistance (mΩ) |
|---|---|---|---|---|
| 1 | 4.42 | 9 | 4.32 | 15.1 |
| 2 | 4.32 | 9.02 | 4.3 | 15.9 |
| 3 | 4.4 | 9.12 | 4.41 | 15.7 |
| 4 | 4.45 | 9.1 | 4.42 | 15.8 |
| 5 | 4.45 | 9.19 | 4.43 | 15.5 |
| 6 | 4.4 | 9.14 | 4.45 | 15.5 |
| 7 | 4.35 | 9.05 | 4.49 | 15.4 |
| 8 | 4.41 | 9.21 | 4.4 | 15.3 |
| 9 | 4.42 | 9.01 | 4.25 | 15.1 |
| 10 | 4.42 | 9.01 | 4.68 | 15.2 |
| 11 | 4.43 | 9 | 4.5 | 15.5 |
| 12 | 4.4 | 9.13 | 4.51 | 15.5 |
| 13 | 4.51 | 9.16 | 4.56 | 14.9 |
| 14 | 4.5 | 9.13 | 4.41 | 14.7 |
| 15 | 4.55 | 9 | 4.33 | 14.6 |
| 16 | 4.31 | 9 | 4.37 | 14.8 |
| 17 | 4.32 | 9 | 4.45 | 15 |
| 18 | 4.37 | 9.17 | 4.45 | 15.5 |
| 19 | 4.41 | 9.1 | 4.39 | 15.7 |
| 20 | 4.41 | 9.06 | 4.56 | 15.2 |
| 21 | 4.43 | 9.06 | 4.3 | 15.9 |
| 22 | 4.5 | 9.06 | 4.33 | 15.7 |
| 23 | 4.49 | 9.06 | 4.39 | 15.2 |
| 24 | 4.47 | 9.21 | 4.37 | 15.3 |
| 25 | 4.45 | 9.05 | 4.5 | 15.4 |

As shown in Table 2, the batteries of Examples 1 and 2 and Comparative Example 1 have a small internal resistance (about 4.5 to 9.0 mΩ, on average). On the other hand, the batteries of Comparative Example 2 have a large internal resistance (about 15.5 mΩ, on average). This is because the electron conduction from the electrode at the opposite end to the current collector lead is inefficient in the batteries of Comparative Example 2. On the other hand, the distance to the current collector lead is shortened in the connection structure of the other batteries, resulting in the reduction in the internal resistance. In view of the results shown in Example 2, it is clear that the current collecting structure of the present invention is still effective, depending on the reaction balance of the battery, even when the current collecting structure is applied only to one of the positive and negative electrodes.

In the embodiment described above, the current collecting structure of the present invention has been applied to a lithium ion rechargeable battery. However, the present invention may also be applied to a battery having other wound electrode assembly structure such as a nickel metal hydride battery and an electric double layer capacitor.

As described above, an electrochemical element having a small internal resistance and a high power output is produced with a high yield by means of the current collection structure according to the present invention. Therefore, an electrochemical element preferable for a driving power source of a power tool or an electric vehicle in which a charge/discharge at a high-rate current is required is provided.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. An electrochemical element comprising an electrode assembly that is accommodated in a case with an electrolyte, the electrode assembly including a positive electrode formed of a strip-shaped positive current collector coated with a positive electrode active material and a negative electrode formed of a strip-shaped negative current collector coated with a negative electrode active material, the positive electrode and the negative electrode being wound around a separator interposed therebetween, a positive lead bonded to the positive electrode serving as an external positive connection terminal, a negative lead bonded to the negative electrode serving as an external negative connection terminal, wherein:

the positive electrode includes an exposed current collector portion with a predetermined width at least at one end in a width direction where the positive electrode active material has not been coated;

the negative electrode includes an exposed current collector portion with a predetermined width at least at the other end in the width direction where the negative electrode active material has not been coated;

the separator has a width that is smaller than a width of the positive and negative electrodes, the positive and negative electrodes with the separator interposed therebetween being wound around to form the electrode assembly having an ellipsoidal cross-section; and the exposed current collector portion of the positive electrode protruding beyond the separator from one end being pressed in a shorter side direction of the ellipsoidal cross-section and being welded to form a welding joint, the exposed current collector portion of the negative electrode protruding beyond the separator from an other end pressed in the shorter side direction of the ellipsoidal cross-section being welded to form a welding joint, wherein the positive and negative electrodes form an oval shape on both sides of the welding joint, wherein the positive lead and the negative lead are connected to the positive electrode and the negative electrode, respectively, such that the positive lead is connected to the exposed current collector portion formed on the positive electrode at one end in a lengthwise direction with the positive lead parallel to the end of the positive electrode and extending substantially the entire width of the positive electrode, and the negative lead is connected to the exposed current collector portion formed on the negative electrode at an other end in the lengthwise direction with the negative lead parallel to the end of the negative electrode and extending substantially the entire width of the negative electrode, and wherein the positive lead is connected to the positive electrode at one end of the wound electrode assembly, and the negative lead is connected to an opposite end of the wound electrode assembly.

2. An electrochemical element comprising an electrode assembly accommodated in a case with an electrolyte, the electrode assembly including a positive electrode formed of a strip-shaped positive current collector coated with a positive electrode active material and a negative electrode formed of a strip-shaped negative current collector coated with a negative electrode active material, the positive electrode and the negative electrode being wound around a separator interposed therebetween, a positive lead bonded to the positive electrode serving as an external positive connection terminal, a negative lead bonded to the negative electrode serving as an external negative connection terminal, wherein:

one of the positive electrode and the negative electrode including an exposed current collector portion at least at one end in a width direction where an associated one of the positive electrode active material and the negative electrode active material has not been coated;

the separator has a width that is smaller than a width of the positive and negative electrodes, the positive and negative electrodes with the separator interposed therebetween being wound around to form the electrode assembly having an ellipsoidal cross-section; and the exposed current collector portion of the one of the positive electrode and the negative electrode protruding beyond the separator from one end being pressed in a shorter side direction of the ellipsoidal cross-section and welded to form a welding joint, wherein the positive and negative electrodes form an oval shape on both sides of the welding joint, wherein the positive lead and the negative lead are connected to the positive electrode and the negative electrode, respectively, such that the positive lead is connected to the exposed current collector portion formed on the positive electrode at one end in a lengthwise direction with the positive lead parallel to the end of the positive electrode and extending substantially the entire width of the positive electrode, and the negative lead is connected to the exposed current collector portion formed on the negative electrode at an other end in the lengthwise direction with the negative lead parallel to the end of the negative electrode and extending substantially the entire width of the negative electrode, and wherein the positive lead is connected to the positive electrode at one end of the wound electrode assembly, and the negative lead is connected to an opposite end of the wound electrode assembly.

3. The electrochemical element of claim 1, wherein:

a position of the separator interposed between the one of the positive electrode and the negative electrode and the width of the separator are adjusted such that edges thereof are located inside an edge of the exposed current collector portion pressed and welded and are located outside an edge of the electrode not pressed and welded.

4. The electrochemical element of claim 1, wherein:

one of the positive lead and the negative lead is connected to the exposed current collector portion to be pressed and welded.

5. The electrochemical element of claim 2, wherein:

a position of the separator interposed between the one of the positive electrode and the negative electrode and the width of the separator are adjusted such that edges thereof are located inside an edge of the exposed current collector portion pressed and welded and are located outside an edge of the electrode not pressed and welded.

6. The electrochemical element of claim 2, wherein:

one of the positive lead and the negative lead is connected to the exposed current collector portion to be pressed and welded.

7. An electrochemical element, comprising:

a positive electrode that includes an exposed current collector portion to which a positive electrode active material is applied, and including a portion where the positive electrode active material is not coated thereon;

a negative electrode that includes an exposed current collector portion to which a negative electrode active material is applied, and including a portion where the negative electrode active material is not coated thereon; and a separator interposed between the positive electrode and the negative electrode, the separator and the positive electrode and the negative electrode being wound to form an electrode assembly having an ellipsoidal cross-section, wherein an exposed current collector portion of the positive electrode protruding beyond the separator from one end being pressed in a shorter side direction of the ellipsoidal cross-section to form a first welding joint, an exposed current collector portion of the negative electrode protruding beyond the separator from an other end being pressed in the shorter side direction of the ellipsoidal cross-section to form a second welding joint, wherein the positive and negative electrodes form an oval shape on both sides of the welding joints, wherein the positive lead and the negative lead are connected to the positive electrode and the negative electrode, respectively, such that the positive lead is connected to the exposed current collector portion formed on the positive electrode at one end in a lengthwise direction with the positive lead parallel to the end of the positive electrode and extending substantially the entire width of the positive electrode, and the negative lead is connected to the exposed current collector portion formed on the negative electrode at an other end in the lengthwise direction with the negative lead parallel to the end of the negative electrode and extending substantially the entire width of the negative electrode, and wherein the positive lead is connected to the positive electrode at one end of the wound electrode assembly, and the negative lead is connected to an opposite end of the wound electrode assembly.

8. The electrochemical element of claim 7, wherein a position of the separator interposed between the positive electrode and the negative electrode and a width of the separator are adjusted such that edges thereof are located inside a first edge of the exposed current collector portion to be pressed and welded and are located outside a second edge not to be pressed and welded.

9. The electrochemical element of claim 7, wherein one of the positive lead and the negative lead is connected to the associated exposed current collector portion to be pressed and welded.

10. The electrochemical element of claim 7, wherein a lead is pressed and welded to one exposed current collector portion.

* * * * *